United States Patent
Horikawa

(10) Patent No.: US 11,343,191 B2
(45) Date of Patent: May 24, 2022

(54) IN-FACILITY WIRELESS COMMUNICATION SYSTEM AND METHOD FOR DETERMINING LOCATIONS BASED ON TAG ORIENTATION

(71) Applicants: Kabushiki Kaisha Toshiba, Tokyo (JP); Toshiba Electronic Devices & Storage Corporation, Tokyo (JP)

(72) Inventor: Seiichiro Horikawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/995,208

(22) Filed: Aug. 17, 2020

(65) Prior Publication Data
US 2021/0281519 A1    Sep. 9, 2021

(30) Foreign Application Priority Data

Mar. 9, 2020 (JP) .............................. JP2020-040009

(51) Int. Cl.
*H04W 28/02* (2009.01)
*G01S 5/00* (2006.01)
(Continued)

(52) U.S. Cl.
CPC ............ *H04L 47/14* (2013.01); *G01S 5/0027* (2013.01); *G01S 5/0036* (2013.01); *G01S 5/10* (2013.01);
(Continued)

(58) Field of Classification Search
CPC ....... H04W 4/40; H04W 76/22; H04W 76/11; H04W 4/029; H04W 4/00; H04W 52/02; H04W 4/02; H04W 4/44; H04W 4/023; H04W 28/0875; H04W 28/08; H04W 28/0883; H04W 28/0892; H04W 4/20;
(Continued)

(56) References Cited

U.S. PATENT DOCUMENTS 8,150,421 B2    4/2012    Ward et al.
9,213,082 B2   12/2015    Aggarwal et al.
(Continued)

FOREIGN PATENT DOCUMENTS

JP    2010-504701 A    2/2010
JP    2012-509483 A    4/2012
JP       6646684 B2    2/2020

*Primary Examiner* — Meless N Zewdu
(74) *Attorney, Agent, or Firm* — Allen & Overy LLP

(57) ABSTRACT

A wireless communication system includes a control station and a plurality of second wireless communication apparatuses. The control station includes a management table that holds sending permission information indicating whether or not to transmit a packet for requesting to send an orientation estimation auxiliary signal. The plurality of second wireless communication apparatuses each refer to the management table, transmit the packet to a first wireless communication apparatus in response to the sending permission information, and perform orientation estimation using the orientation estimation auxiliary signal transmitted from the first wireless communication apparatus.

6 Claims, 8 Drawing Sheets

(51) Int. Cl.
  *H04W 4/20* (2018.01)
  *H04L 45/02* (2022.01)
  *G01S 5/14* (2006.01)
  *H04W 4/029* (2018.01)
  *G01S 5/10* (2006.01)
  *H04W 64/00* (2009.01)

(52) U.S. Cl.
  CPC ............ *G01S 5/14* (2013.01); *H04L 45/02* (2013.01); *H04W 4/029* (2018.02); *H04W 4/20* (2013.01); *H04W 64/003* (2013.01)

(58) Field of Classification Search
  CPC ... H04W 64/00; H04W 64/003; H04W 28/02; H04W 4/185; H04W 12/10; H04W 12/104; H04W 4/026; H04W 4/021; H04W 4/33; H04W 4/30; H04W 16/20; H04W 16/225; H04L 29/08; H04L 67/125; H04L 12/751; H04L 47/14; Y02D 30/70; G01S 5/00; G01S 5/10; G01S 5/14; G01S 5/0027; G01S 5/0036; G01S 45/02; G01S 3/48; G01S 3/8006; G01S 5/011; G01S 5/017; G01S 5/0226; G01S 5/0231; G01S 5/0236; G01S 5/0242; G01S 5/0289
  See application file for complete search history.

(56) References Cited

U.S. PATENT DOCUMENTS

| | | |
|---|---|---|
| 9,841,494 B2 | 12/2017 | Meadow |
| 10,310,053 B2 | 6/2019 | Meadow |
| 10,319,162 B1 | 6/2019 | Meadow |
| 10,416,280 B2 | 9/2019 | Meadow |
| 10,677,886 B2 | 6/2020 | Meadow |
| 10,777,306 B1* | 9/2020 | LaBorde ............. G16H 10/65 |
| 2007/0155489 A1 | 7/2007 | Beckley et al. |
| 2009/0005061 A1 | 1/2009 | Ward et al. |
| 2010/0135178 A1 | 6/2010 | Aggarwal et al. |
| 2010/0222081 A1 | 9/2010 | Ward et al. |
| 2013/0237246 A1 | 9/2013 | Aggarwal et al. |
| 2014/0148196 A1* | 5/2014 | Bassan-Eskenazi et al. ............. H04W 4/04 |
| 2015/0160329 A1* | 6/2015 | Ranki et al. ............. G01S 5/04 |
| 2016/0021511 A1* | 1/2016 | Jin et al. ............. H04W 4/04 |
| 2016/0189514 A1* | 6/2016 | Todasco et al. ....... G08B 21/02 |
| 2017/0303071 A1* | 10/2017 | Haverinen et al. ... H04W 4/008 |
| 2018/0158302 A1* | 6/2018 | Hosseini et al. ... G08B 12/2485 |
| 2018/0172799 A1 | 6/2018 | Meadow |
| 2019/0285724 A1 | 9/2019 | Meadow |
| 2019/0371098 A1 | 12/2019 | Meadow |
| 2020/0105075 A1 | 4/2020 | Meadow et al. |
| 2021/0058757 A1* | 2/2021 | Lee et al. ............. H04W 4/80 |
| 2021/0096207 A1* | 4/2021 | Torrini et al. ........... G01S 3/043 |

* cited by examiner

FIG. 3

MANAGEMENT TABLE IN CONTROL STATION

| | RECEPTION INTENSITY [dbm] | | |
|---|---|---|---|
| | LOCATOR 30 | LOCATOR 31 | LOCATOR 32 |
| TAG 0 | −55 | −78 | UNCONNECTED |
| TAG 1 | −50 | −70 | −84 |
| TAG 2 | −55 | −85 | −78 |
| TAG 3 | −60 | −56 | −72 |
| TAG 4 | −65 | −50 | −66 |
| TAG 5 | −70 | −60 | −60 |
| ⋮ | ⋮ | ⋮ | ⋮ |
| TAG N | −80 | −86 | −60 |

| | ORIENTATION ESTIMATION PROCESSING PERMISSION | | |
|---|---|---|---|
| | LOCATOR 30 | LOCATOR 31 | LOCATOR 32 |
| TAG 0 | ○ | ○ | UNCONNECTED |
| TAG 1 | ○ | ○ | |
| TAG 2 | ○ | | ○ |
| TAG 3 | ○ | ○ | |
| TAG 4 | | ○ | ○ |
| TAG 5 | | ○ | ○ |
| ⋮ | | | |
| TAG N | ○ | | ○ |

FIG. 4

MANAGEMENT TABLE IN CONTROL STATION — 72

| | DISTANCE[m] | | |
|---|---|---|---|
| | LOCATOR 30 | LOCATOR 31 | LOCATOR 32 |
| TAG 0 | 5 | 8 | UNCONNECTED |
| TAG 1 | 6 | 8 | 20 |
| TAG 2 | 8 | 20 | 15 |
| TAG 3 | 10 | 15 | 25 |
| TAG 4 | 20 | 10 | 15 |
| TAG 5 | 25 | 8 | 10 |
| ⋮ | ⋮ | ⋮ | ⋮ |
| TAG N | 15 | 25 | 10 |

⬇

ORIENTATION ESTIMATION PROCESSING PERMISSION — 73

| | LOCATOR 30 | LOCATOR 31 | LOCATOR 32 |
|---|---|---|---|
| TAG 0 | ○ | ○ | UNCONNECTED |
| TAG 1 | ○ | ○ | |
| TAG 2 | ○ | | ○ |
| TAG 3 | ○ | ○ | |
| TAG 4 | | ○ | ○ |
| TAG 5 | | ○ | ○ |
| ⋮ | ⋮ | ⋮ | ⋮ |
| TAG N | ○ | | ○ |

FIG. 5

MANAGEMENT TABLE IN CONTROL STATION

| | COORDINATES (x,y) | STAYING TIME PERIOD [SEC] |
|---|---|---|
| TAG 0 | (5,8) | 2 |
| TAG 1 | (6,3) | 0.5 |
| TAG 2 | (3,10) | 2 |
| TAG 3 | (15,20) | 0.7 |
| TAG 4 | (2,8) | 1.5 |
| TAG 5 | (8,2) | 3 |
| ⋮ | ⋮ | ⋮ |
| TAG N | (0,10) | 0.5 |

| | ORIENTATION ESTIMATION PROCESSING PERMISSION | | |
|---|---|---|---|
| | LOCATOR 30 | LOCATOR 31 | LOCATOR 32 |
| TAG 0 | | | |
| TAG 1 | ○ | ○ | ○ |
| TAG 2 | | | |
| TAG 3 | ○ | ○ | ○ |
| TAG 4 | ○ | ○ | ○ |
| TAG 5 | | | |
| ⋮ | ⋮ | ⋮ | ⋮ |
| TAG N | ○ | ○ | ○ |

FIG. 7

MANAGEMENT TABLE IN CONTROL STATION — 70

| | RECEPTION INTENSITY[dbm] | | |
|---|---|---|---|
| | LOCATOR 30 | LOCATOR 31 | LOCATOR 32 |
| TAG 0 | −55 | −78 | UNCONNECTED |
| TAG 1 | −50 | −70 | −84 |
| TAG 2 | −55 | −85 | −78 |
| TAG 3 | −60 | −56 | −72 |
| TAG 4 | −65 | −50 | −66 |
| TAG 5 | −70 | −60 | −60 |
| ⋮ | ⋮ | ⋮ | ⋮ |
| TAG N | −80 | −86 | −60 |

⇩

CTE REQUEST SENDING PERMISSION — 76

| | LOCATOR 30 | LOCATOR 31 | LOCATOR 32 |
|---|---|---|---|
| TAG 0 | ◯ | ◯ | UNCONNECTED |
| TAG 1 | ◯ | ◯ | |
| TAG 2 | ◯ | | ◯ |
| TAG 3 | ◯ | ◯ | |
| TAG 4 | | ◯ | ◯ |
| TAG 5 | | ◯ | ◯ |
| ⋮ | | | |
| TAG N | ◯ | | ◯ |

IN-FACILITY WIRELESS COMMUNICATION SYSTEM AND METHOD FOR DETERMINING LOCATIONS BASED ON TAG ORIENTATION

CROSS REFERENCE TO RELATED APPLICATION

This application is based upon and claims the benefit of priority from Japanese Patent Application No. 2020-040009, filed Mar. 9, 2020; the entire contents of which are incorporated herein by reference.

FIELD

Embodiments described herein relate generally to a wireless communication system and a wireless communication apparatus.

BACKGROUND

In recent years, Bluetooth 5.1 has been released as a, new standard of proximity wireless communication: Bluetooth (registered trademark). In, the new standard, an orientation estimation function is added. The orientation estimation function is expected, to be used to detect objects to be searched for and manage commodities, for example.

A wireless communication system that performs orientation estimation includes a control station and a plurality of locators. The plurality of locators respectively receive packets (orientation estimation signals) to which CTE (constant tone extension) is added from a tag to be attached to a commodity or the like, to perform orientation estimation. The control station, estimates a position of the tag using respective orientation estimation results from the plurality of locators.

BRIEF DESCRIPTION OF THE DRAWINGS

FIG. 3 is a diagram illustrating an example of a management table provided in a control station;

FIG. 4 is a diagram illustrating an example of a management table provided in the control station;

FIG. 5 is a diagram illustrating an example of a management table provided in the control station;

FIG. 7 is a diagram illustrating an example of a management table provided in a control station.

DETAILED DESCRIPTION

A wireless communication system according to an embodiment includes a control station and a plurality of second wireless communication apparatuses. The control station includes a management table that holds sending permission information indicating whether or not, to transmit a packet for requesting to send an orientation estimation auxiliary signal. The plurality of second wireless communication apparatuses each refer to the management table, transmit the packet to a first wireless communication apparatus in response to the sending permission information, and perform orientation estimation using the orientation estimation auxiliary signal transmitted from the first wireless communication apparatus.

Embodiments will be described in detail below with reference to the drawings.

First Embodiment

Figure 1:
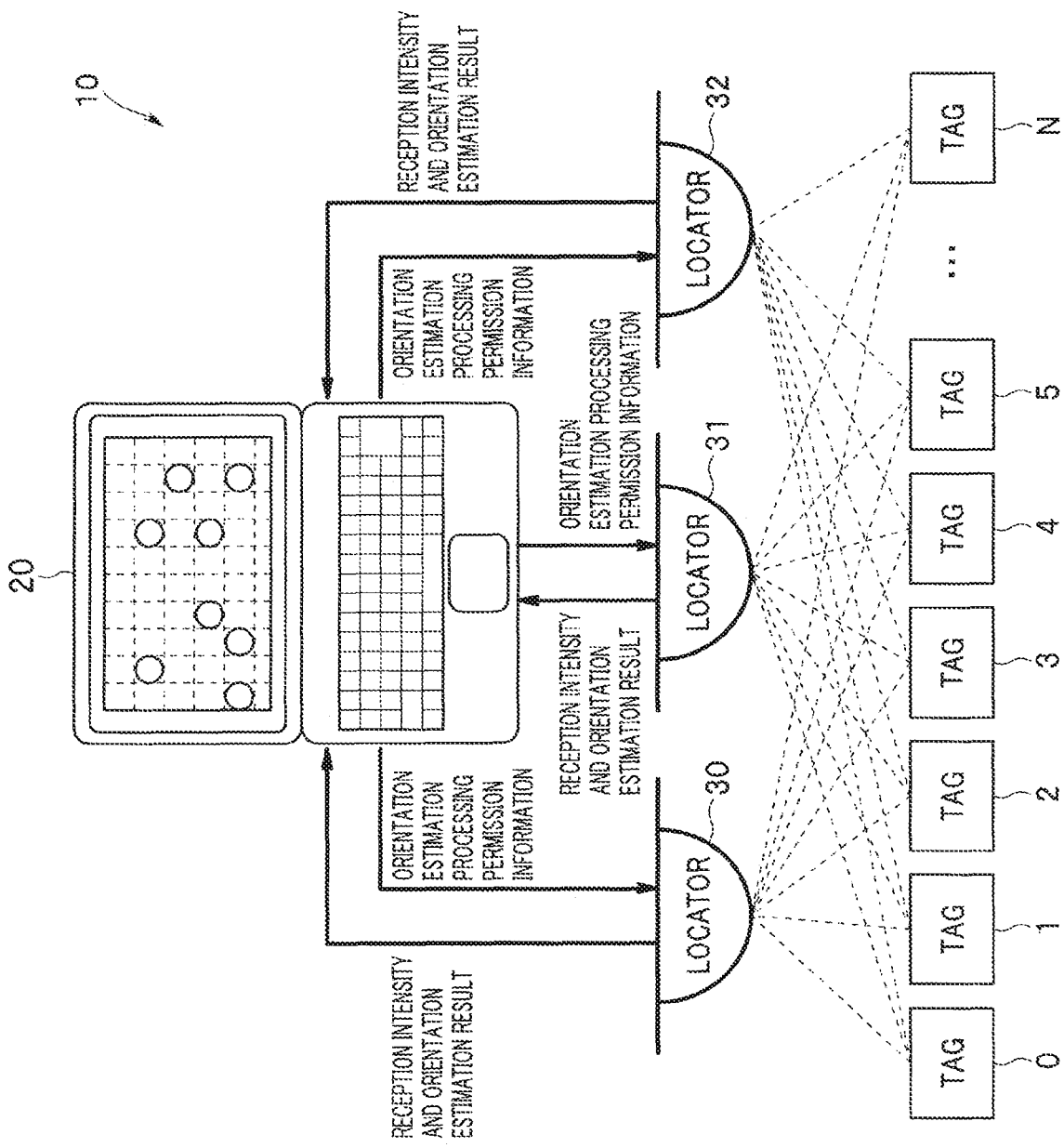
FIG. 1 is a diagram illustrating a configuration of a wireless communication system according to a first embodiment.

FIG. 1 is a diagram illustrating a configuration of a wireless communication system according to a first embodiment.

A wireless communication system 10 includes a control station 20 and a plurality of locators 30, 31, and 32. The wireless communication system 10 is used to manage commodities within a wide facility such as a warehouse or a factory. The plurality of locators 30, 31, and 32 are installed with predetermined spacing in a ceiling within the facility. Tags 0 to N are respectively attached to the commodities. Packets are respectively transmitted and received between the locators 30, 31, and 32 and each of the tags 0 to N. CTE (constant tone extension) is added to the packet transmitted from the tag. More specifically, the locators 30, 31, and 32 respectively transmit CTE request, packets to each of the tags 0 to N. Each of the tags 0 to N transmits the packets to which the CTE as an orientation estimation auxiliary signal is added, respectively, to the locators 30, 31, and 32 when receiving the CTE request packets.

The locators 30, 31, and 32 respectively detect reception intensities of the packets transmitted from each of the tags 0 to N, and output the detected reception intensities to the control station 20. The locators 30, 31, and 32 together output respective frequency channels to the control station 20. The locators 30, 31, and 32 respectively output orientation estimation results for each of the tags 0 to N to the control station 20.

The control station 20 constituted by a personal computer or the like outputs orientation estimation processing permission information for each of the tags 0 to N from the inputted reception intensities, respectively, to the locators 30, 31, and 32. Each of the locators 30, 31, and 32 selects whether or not to perform orientation estimation processing depending on the orientation estimation processing permission information from the control station 20. Note that the control station 20 is not limited to the personal computer, but may be a portable terminal such as a tablet. In this case, a user can immediately confirm respective positions and the number of the commodities within the facility while carrying the terminal.

Figure 2:
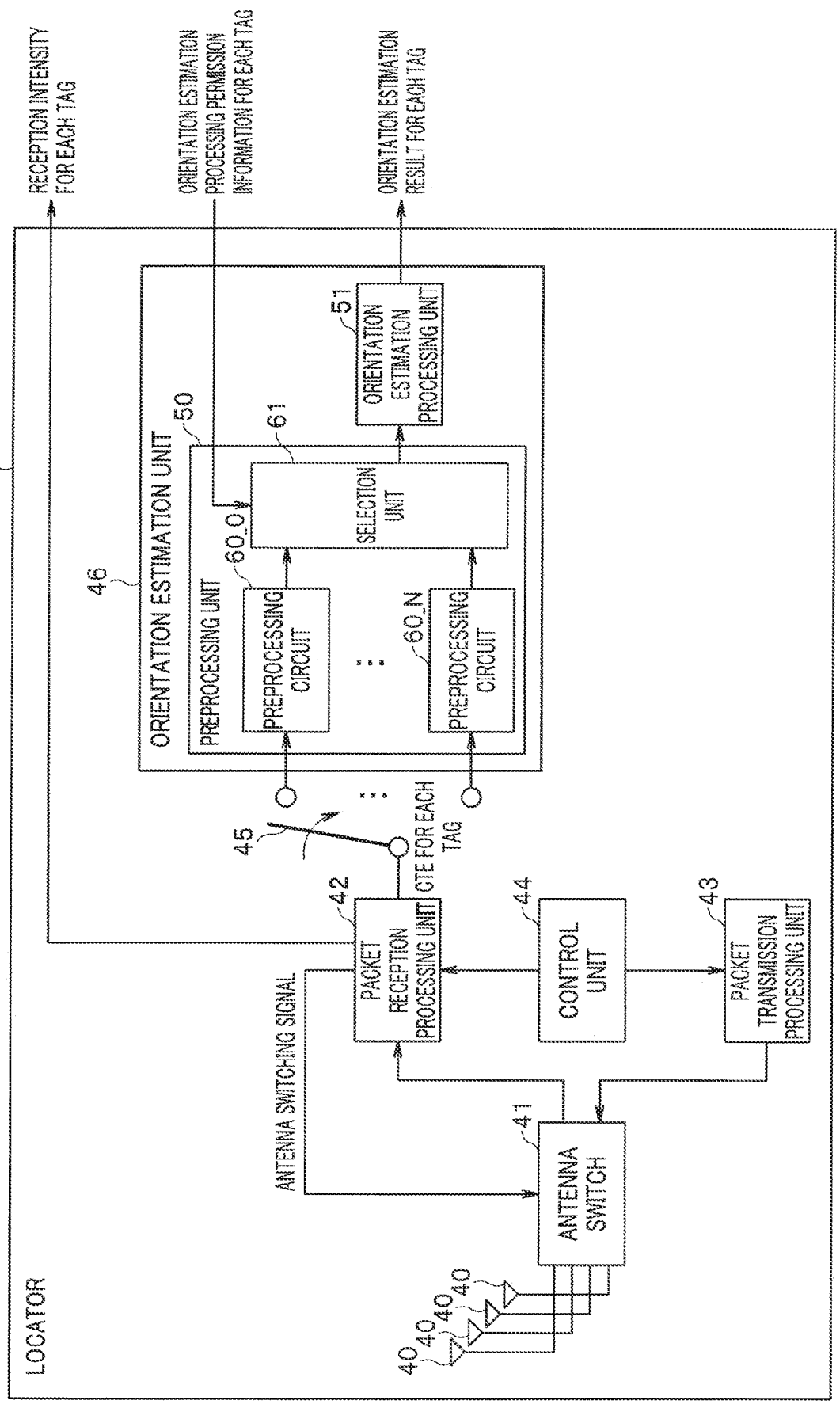
FIG. 2 is a block diagram illustrating a detailed configuration of a locator according to the first embodiment.

A specific configuration of the locator 30 will be described. FIG. 2 is a block diagram illustrating a detailed configuration of the locator according to the first embodiment. Each of the locators 31 and 32 has a similar configuration to the configuration of the locator 30.

The locator 30 constituting the wireless communication apparatus includes a plurality of antennas 40, an antenna switch 41, a packet reception processing unit 42, a packet transmission processing unit 43, a control unit 44, a switch 45, and an orientation estimation writ 46. The orientation estimation unit 46 includes a preprocessing unit 50 and an orientation estimation processing unit 51. The preprocessing unit 50 includes a plurality of preprocessing circuits 60_0, . . . , 60_N and a selection unit 61.

The locator 30 transmits the CTE request packet to each of the tags 0 to N. When receiving the CTE request packet, each of the tags 0 to N transmits to the locator 30 a packet to which CTE is added. The locator 30 receives the packet transmitted from each of the tags 0 to N.

The control unit 44 controls the packet reception processing unit 42 and the packet transmission processing unit 43. The packet transmission processing unit 43 transmits the CTE request packet to each of the tags 0 to N via the antenna 40, The antenna switch 41 switches the antenna and receives the packet only during GTE reception in response to an antenna switching signal from the packet reception processing unit 42. The received packet is outputted to the packet reception processing unit 42. Accordingly, the packet reception processing unit 42 and the packet transmission processing unit 43 constitute a transmission/reception unit configured to transmit the CTE request packet to each of the tags 0 to N and receive the packet to which the CTE is added from the tag. Although the foregoing and FIG. 2 illustrate an orientation estimation method using an AoA (angle of arrival) system, the orientation estimation method may be performed using an AoD (angle of departure) system. The AoA system is a system for receiving a radio wave (packet) transmitted from one of the antennas by switching the plurality of antennas to detect a difference in angle of arrival, to perform orientation estimation. On the other hand, the AoD system is a system for receiving a radio wave transmitted by switching the plurality of antennas using one of the antennas to detect a difference in radiation angle (angle of departure), to perform orientation estimation.

The packet reception processing unit 42 extracts the CTE from the received packet from each of the tags 0 to N, subjects the CTE to predetermined processing (IQ sampling) defined in Bluetooth 5.1, and then outputs the CTE to the orientation estimation unit 46. The packet reception processing unit 42 switches the switch 45, and outputs the CTEs for the tags 0 to N, respectively, to the preprocessing circuits 60_0 to 60_N.

An IQ sampling value of the CTE for the tag 0 is inputted to the preprocessing circuit 60_0, and the CTE for the tag N is inputted to the preprocessing circuit 60_N. Each of the preprocessing circuits 60 averages the inputted CTE for the tag, and outputs a value obtained by averaging the CTE to the selection unit 61. Note that the above-described averaging processing is a processing method corresponding to a processing method of the orientation estimation processing unit 51 in a succeeding stage. If the orientation estimation processing unit 51 uses a music algorithm, for example, each of the preprocessing circuits 60 averages the CTE after subjecting the CTE to a correlation matrix operation.

The selection unit 61 outputs the value inputted from each of the preprocessing circuits 60 to the orientation estimation processing unit 51 in response to the orientation estimation processing permission information for each of the tags inputted from the control station 20.

The orientation estimation processing unit 51 estimates an orientation of each of the tags from the inputted value, and outputs an orientation estimation result to the control station 20. An orientation estimation method may be arbitrary, and may be a music algorithm or a beamformer algorithm.

The packet reception processing unit 42 detects a reception intensity for each of respective frequency channels of the tags 0 to N from the inputted packet, and outputs reception intensity information to the control station 20. In other words, the reception intensity information for each of the tags 0 to N is inputted from the locator 30 to the control station 20. Similarly, the reception intensity information for each of the tags 0 to N is inputted from each of the locators 31 and 32 to the control station 20.

The control station 20 generates a reception intensity management table 70 from the respective inputted reception intensity information for the tags 0 to N. The control station 20 generates an orientation estimation processing permission information management table 71 from the management table 70. FIG. 3 is a diagram illustrating an example of a management table provided in the control station. In the example illustrated in FIG. 3, the reception intensity is associated with each of the tags. Note that the management table 70 may be generated for each of the frequency channels, or may be generated by averaging the reception intensities corresponding to all the frequency channels. Every time the reception intensity information is inputted, the reception intensity management table 70 and the orientation estimation processing permission information management table 71 are updated. The control station 20 refers to the management table 71 and outputs the orientation estimation processing permission information, respectively, to the plurality of locators 30, 31, and 32 when the management table 71 is updated.

If there are respective orientation estimation results from the at least two locators, a position on a plane can be estimated. The control station 20 outputs the orientation estimation processing permission information, respectively, to the two locators each having a high reception intensity.

In the example illustrated in FIG. 3, although the tag 0 is connected to the locators 30 and 31, but is not connected to the locator 32. Accordingly, the control station 20 outputs the orientation estimation processing permission information, respectively, to the locators 30 and 31, as illustrated in the management table 71.

The tag 1 is connected to all the locators 30, 31, and 32. The respective reception intensities of the locators 30 and 31 among the connected locators are high. As a result, the control station 20 outputs the orientation estimation processing permission information, respectively, to the locators 30 and 31.

As a result, the locator 30 performs orientation estimation processing for the tags 0, 1, 2, 3, and N, and does not perform orientation estimation processing for the tags 4 and 5. The locator 31 performs orientation estimation processing for the tags 0, 1, 3, 4, and 5, and the does not perform orientation estimation processing for the tags 2 and N. The locator 32 performs orientation estimation processing for the tags 2, 4, 5, and N, and does not perform orientation estimation processing for the tags 1 and 3.

For each of the locators 30, 31, and 32, the tags for performing orientation estimation processing are thinned depending on the orientation estimation processing permission information. Accordingly, in the wireless communication system according to the present embodiment, a time period required for orientation estimation processing in each of the locators 30, 31, and 32, i.e., orientation estimation updating intervals can be shortened, and a frequency of position estimation in the control station 20 and a user's convenience can be improved. When the orientation estimation intervals are shortened, the user can grasp respective accurate positions and an accurate number of the commodities in real time, and can improve a user's convenience.

Note that any one of the locators 30, 31, and 32 may have the function of the control station 20. If the locator 30 has the function of the control station 20, for example, the locator 30 receives information about the reception intensity for each of the tags 0 to N from the locators 31 and 32. The locator 30 transmits the orientation estimation processing permission information to the locators 31 and 32 based on the information about the reception intensity detected by itself and the received information about the reception intensity. As a result, the orientation estimation updating intervals can be similarly shortened.

Second Embodiment

Next, a second embodiment will be described.

Although the tag for performing orientation estimation processing depending on the reception intensity is selected in the first embodiment, a tag for performing orientation estimation processing depending on each distance between a locator and the tag is selected in the second embodiment.

FIG. 4 is a diagram illustrating an example of a management table provided in a control station. A control station 20 calculates from orientation estimation results for each of tags 0 to N respective distances between locators 30, 31, and 32 and the tag by a principle of triangulation, for example. As a result, the control station 20 generates a distance management table 72.

The control station 20 judges whether or not the distance is less than a predetermined threshold value, and generates an orientation estimation processing permission information management table 73. The control station 20 calculates the distance every time the orientation estimation result is inputted thereto, and updates the management tables 72 and 73.

In the example illustrated in FIG. 4, the tag 0 is connected to the locators 30 and 31, but is not connected to the locator 32. Accordingly, the control station 20 outputs orientation estimation processing permission information, respectively, to the locators 30 and 31, as illustrated in the management table 73.

The tag 1 is connected to all the locators 30, 31, and 32. The control station 20 judges whether or not respective distances between the locators 30, 31, and 32 and each of the tags 0 to N are less than a predetermined threshold value from the management table 72. If the predetermined threshold value is set to 20 [m], for example, the respective distances between the locators 30 and 31 and the tag 1 are less than the predetermined threshold value. As a result, the control station 20 outputs orientation estimation processing permission information, respectively, to the locators 30 and 31.

As a result, for each of the locators 30, 31, and 32, the tags for performing orientation estimation processing are thinned depending on the orientation estimation processing permission information from the control station 20. Accordingly, in the wireless communication system according to the present embodiment, a time period required for orientation estimation processing in the locator, i.e., orientation estimation updating intervals can be shortened, and a frequency of position estimation can be increased.

Third Embodiment

Next, a third embodiment will be described.

Although the tag for performing orientation estimation processing depending on the reception intensity is selected in the first embodiment, any one of tags 0 to N for performing orientation estimation processing depending on a time period (staying time period) during which the tag stays in the same place within a facility, for example, is selected in the third embodiment.

FIG. 5 is a diagram illustrating an example of a management table provided in a control station. A control station 20 calculates from an orientation estimation result for each of tags 0 to N an estimation position, for example, coordinates of the tag. The control station 20 measures a time period during which each of the tags 0 to N stays at the calculated estimation position. As a result, the control station 20 generates a staying time period management table 74.

The control station 20 judges whether or not the staying time period is less than a predetermined time period, and generates an orientation estimation processing permission information management table 75. The control station 20 outputs orientation estimation processing permission information when the staying time period is less than the predetermined time period, and does not output orientation estimation processing permission information when the staying time period is the predetermined time period or more. The control station 20 updates the management tables 74 and 75 every time the orientation estimation result is inputted thereto.

If the predetermined time period is set to 2 [sec], the respective staying time periods of the tags 1, 3, 4, and N are less than the predetermined time period, and the respective staying time periods of the tags 0, 2, and 5 are the predetermined time period or more in the example illustrated in FIG. 5. As a result, the control station. 20 outputs the orientation estimation processing permission information, respectively, to the locators 30, 31, and 32 to perform orientation estimation processing for each of the tags 1, 3, 4, and N.

The control station 20 cannot calculate the coordinates from the orientation estimation result because orientation estimation processing for each of the tags 0, 2, and 5 is not performed by the locators 30, 31, and 32, As a result, an estimation position is not changed for each of the tags 0, 2, and 5 that stay for the predetermined time period or more. Once orientation estimation processing is not performed, orientation estimation processing is not resumed after that.

The control station 20 outputs the orientation estimation processing permission information, respectively, to the locators 30, 31, and 32 such that orientation estimation processing for each of the tags 0, 2, and 5 that stay for the predetermined time period or more is performed after an elapse of a certain time period. Although the certain time period is set to 10 [sec], for example, the certain time period is not particularly limited to 10 [sec], but may be another number of seconds. As a result, orientation estimation processing can be resumed after an elapse of the certain time period for each of the tags 0, 2, and 5 that stay for the predetermined time period or more.

Note that the control station 20 may output the orientation estimation processing permission information, respectively, to the locators 30, 31, and 32 such that orientation estimation processing for each of the tags 0, 2, and 5 that stay for the predetermined time period or more is performed after orientation estimation processing is not perforated a predetermined number of times. The control station 20 may output the orientation estimation processing permission information, respectively, to the locators 30, 31, and 32 such that orientation estimation processing intervals for each of the tags 0, 2, and 5 that stay for the predetermined time period or more become longer than orientation estimation processing intervals for each of the tags 1, 3, 4, and N that stay for less than the predetermined time period.

As a result, the locators 30, 31, and 32 perform orientation estimation processing for each of the tags 1, 3, 4, and N and do not perform orientation estimation processing for each of the tags 0, 2, and 5. Accordingly, in the wireless communication system according to the present embodiment, a time period required for orientation estimation processing in the locators 30, 31, and 32, that is, the orientation estimation updating intervals can be shortened, and a frequency of position estimation in the control station 20 can be increased.

Note that although a tag for performing orientation estimation processing depending on a staying time period is selected in the present embodiment, the present invention is not limited to this. For example, the control station 20 may compare a movement speed of each of the tags 0 to N with a predetermined threshold value, not to permit orientation estimation processing to be performed when the movement speed is less than the predetermined threshold value.

Fourth Embodiment

Next, a fourth embodiment will be described.

Figure 6:
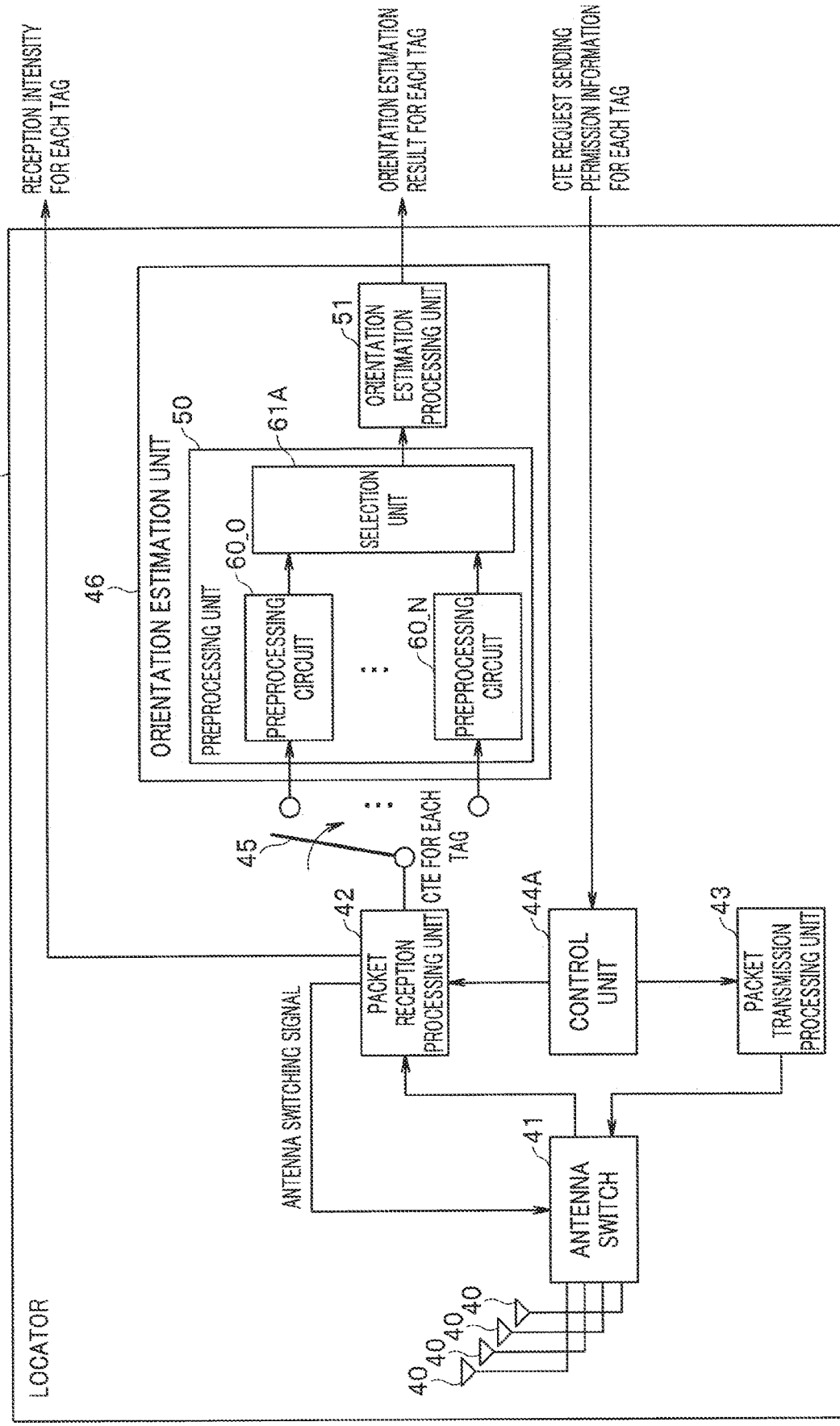
FIG. 6 is a block diagram illustrating a detailed configuration of a locator according to a fourth embodiment.

FIG. 6 is a block diagram illustrating a detailed configuration of a locator according to a fourth embodiment. Note that similar components to the components illustrated in FIG. 2 are assigned the same reference numerals, to omit description of the components in FIG. 6. An entire configuration of the wireless communication system 10 is similar to the entire configuration in the first embodiment.

A locator 30 illustrated in FIG. 6 includes a control unit 44A and a selection unit 61A instead of the control unit 44 and the selection unit 61 illustrated in FIG. 2. The orientation estimation processing permission information for each of the tags is inputted from the control station 20 to the selection unit 61. Orientation estimation processing permission information for each of tags is not inputted from a control station 20 to the selection unit 61A.

CTE request sending permission information for each of the tags is inputted from the control station 20 to the control unit 44A. The control unit 44A controls a packet transmission processing unit 43 in response to the CTE request sending permission information, and performs control as to whether or not to send a CTE request packet to each of tags 0 to N.

FIG. 7 is a diagram illustrating an example of a management table provided in the control station. The control station 20 generates a reception intensity management table 70 from information about a reception intensity for each of the tags 0 to N. The management table 70 is similar to the management table illustrated in FIG. 3. The control station 20 generates a CTE request sending permission information management table 76 from the management table 70. The control station 20 outputs CTE request sending permission information such that the CTE request packet is sent to any one of the tags for two locators each having a high reception intensity.

As a result, the locator 30 sends the CTE request packet for each of the tags 0, 1, 2, 3, and N, and does not send the CTE request packet for each of the tags 4 and 5. Accordingly, in the locator 30, orientation estimation (preprocessing+orientation estimation processing) does not operate for the tags 4 and 5. Similar processing is also performed for the locators 31 and 32.

As a result, for each of the locators 30, 31, and 32, the tags for performing orientation estimation processing are thinned depending on the CTE request sending permission information. As a result, a time period required for orientation estimation (preprocessing+orientation estimation processing), that is, orientation estimation updating intervals in each of the locators 30, 31, and 32 can be shortened, and a frequency of position estimation in the control station 20 can be increased. Accordingly, in the wireless communication system according to the present embodiment, the orientation estimation updating intervals are shortened so that a user's convenience can be improved.

Note that although the control station 20 selects from respective reception intensities for the tags 0 to N the tag for sending the CTE request packet in the present embodiment, the present invention is not limited to this. For example, the control station 20 may select any one of the tags for sending the packet to which CTE is added depending on respective distances between the locators 30, 31, and 32 and the tag or depending on a staying time period of the tag.

Fifth Embodiment

Figure 8:
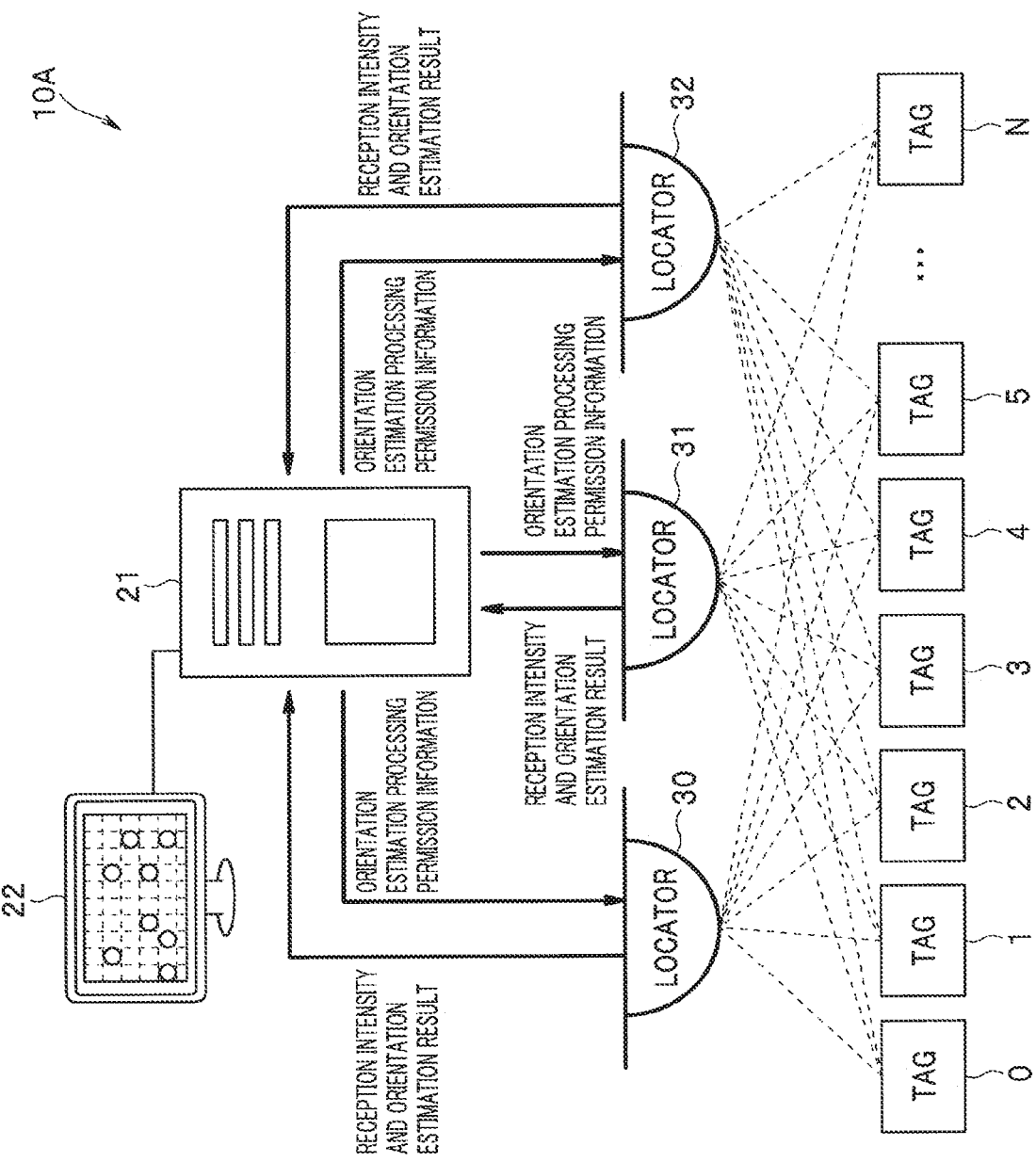
FIG. 8 is a diagram illustrating a configuration of a wireless communication system according to a fifth embodiment.

FIG. 8 is a diagram illustrating a configuration of a wireless communication system according to a fifth embodiment. Note that similar components to the components illustrated in FIG. 1 are assigned the same reference numerals, to omit description of the components in FIG. 8. A wireless communication system 10A according to the present embodiment is configured using a server 21 and a display device 22 instead of the control station 20 in the wireless communication system 10 according to the first embodiment.

Reception intensity information is inputted from each of locators 30, 31, and 32 to the server 21. The server 21 generates management tables 70 and 71 from the reception intensity information. The server 21 refers to the generated management table 71, and outputs orientation estimation processing permission information, respectively, to two of the locators 30, 31, and 32.

Orientation estimation results are respectively inputted from the locators 30, 31, and 32 to the server 21. The server 21 generates display data representing a position of each of tags 0 to N from the orientation estimation result, and outputs the generated display data to the display device 22. The display device 22 displays the position of each of the tags 0 to N based on the display data. The other components are similar to the components in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication system comprising:
    a control station including a management table that holds sending permission information indicating whether or not to transmit a packet for requesting to send an orientation estimation auxiliary signal; and
    a plurality of second wireless communication apparatuses each configured to refer to the management table, transmit the packet to a first wireless communication apparatus in response to the sending permission information, and perform orientation estimation using the orientation estimation auxiliary signal transmitted from the first wireless communication apparatus, wherein
    the control station updates the management table depending on respective distances between the first wireless communication apparatus and the plurality of second wireless communication apparatuses.

2. The wireless communication system according to claim 1, wherein the control station updates the management table depending on a reception intensity of the packet transmitted from the first wireless communication apparatus.

3. The wireless communication system according to claim 1, wherein the control station calculates the distances based on respective orientation estimation results of the plurality of the second wireless communication apparatuses.

4. The wireless communication system according to claim 1, wherein the control station updates the management table depending on a staying time period during which the first wireless communication apparatus stays at a same position.

5. The wireless communication system according to claim 4, wherein
the control station measures the staying time period based on respective orientation estimation results of the plurality of the second wireless communication apparatuses.

6. A wireless communication system comprising:
a control station including a management table that holds permission information indicating whether or not to perform orientation estimation;
a first wireless communication apparatus configured to transmit a packet to which an orientation estimation auxiliary signal is added; and
a plurality of second wireless communication apparatuses each configured to perform orientation estimation of the first wireless communication apparatus using the orientation estimation auxiliary signal based on the permission information in the management table when receiving the packet, wherein
the control station updates the management table depending on respective distances between the first wireless communication apparatus and the plurality of second wireless communication apparatuses.

\* \* \* \* \*